E. W. SINNETT.
TROLLEY.
APPLICATION FILED OCT. 27, 1920.
1,365,201.  Patented Jan. 11, 192.
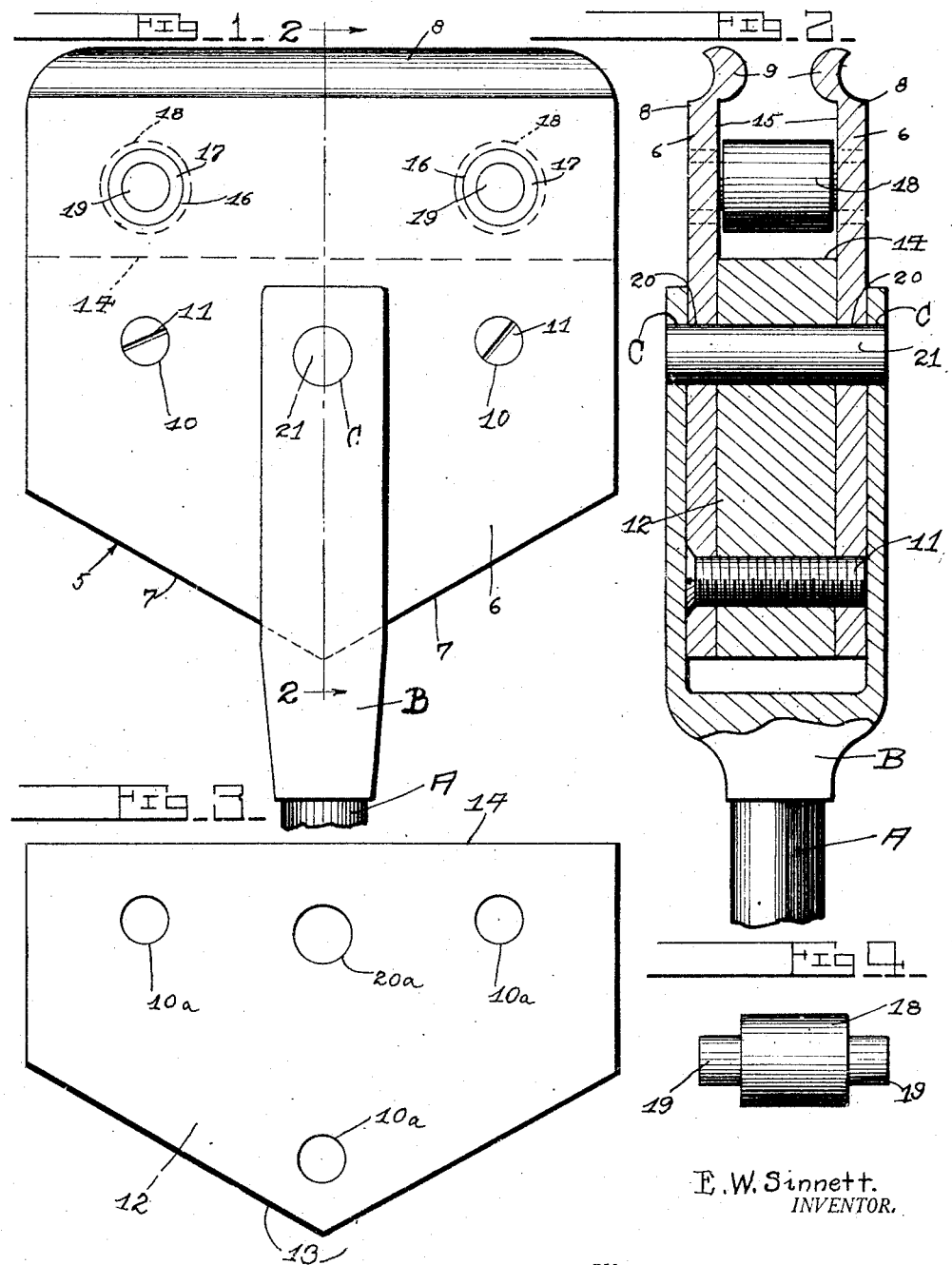
E. W. Sinnett.
INVENTOR.
BY
Watson E. Coleman
ATTORNEY.

UNITED STATES PATENT OFFICE.

EARL W. SINNETT, OF GRAND RAPIDS, MICHIGAN, ASSIGNOR OF FORTY-NINE ONE-HUNDREDTHS TO HENRY A. SINNETT, OF GRAND RAPIDS, MICHIGAN.

TROLLEY.

1,365,201.    Specification of Letters Patent.    Patented Jan. 11, 1921.

Application filed October 27, 1920. Serial No. 419,914.

*To all whom it may concern:*

Be it known that I, EARL W. SINNETT, a citizen of the United States, residing at Grand Rapids, in the county of Kent and State of Michigan, have invented certain new and useful Improvements in Trolleys, of which the following is a specification, reference being had to the accompanying drawings.

This invention relates to trolleys and particularly to a trolley for use in connection with a conventional form of trolley harp.

An object of the invention is to provide a device of this character which may be readily applied to the trolley harp of the trolley pole to replace the old form of trolley wheel.

Another object of the invention is to provide a device of this character capable of engaging the trolley wire at all times, that is, regardless of the condition of the road bed, construction of the trolley wire or speed of the car.

Another object is to provide a device of this character capable of being pivoted within the harp of a trolley pole and wherein sufficient area is provided for permitting contact of the device with the trolley wire at two or more spaced points longitudinally of the trolley.

Another object is to provide a device of this character comprising a small number of parts which may be readily assembled and disassembled.

A still further object of the invention is to provide a trolley of this character capable of being pivotally mounted within the harp of the trolley wheel and adapted to receive a plurality of rollers arranged to engage the trolley wire, whereby additional pivot means is provided for each roller so that accidental disengagement of the trolley from the trolley wire is practically impossible.

With the above and other objects in view, the invention consists in the details of construction and arrangement of parts to be hereinafter more particularly described, fully claimed and illustrated in the accompanying drawings, in which:—

Figure 1 is a side elevation of a trolley constructed in accordance with an embodiment of the invention, the trolley being applied to the trolley harp, Fig. 2 is a section taken on the line 2—2 of Fig. 1, Fig. 3 is a side elevation of the body member, and Fig. 4 is a detail view of the trolley roller.

Referring to the drawings, A designates a conventional form of trolley pole, on the end of which a conventional form of trolley harp B is mounted, the arms of the harp including the usual registering openings C.

In order to constantly supply current to the car when the same is traveling at a great speed and under all conditions, the invention provides a novel form of trolley 5 comprising a pair of plates 6, the longitudinal marginal edge 7 of each plate being canted from the ends thereof to a point centrally of the plate. This edge forms the bottom of the trolley, the canted ends preventing contact of the bottom of the trolley with the bight portion of the harp B. The longitudinal marginal edge 8 of each plate is extended beyond one face of the plate laterally thereof to provide a guard 9 which is substantially concavo-convex in cross section. A plurality of openings 10 are provided and adapted to receive fastening means such as the screws 11, to hold the trolley assembled.

A connector or body member 12 is adapted to be disposed between each of the plates 6, the lower surface 13 of said member coinciding with the canted edges 7 of the plates, while the upper edge 14 terminates slightly above the longitudinal center of the plates. The body member is maintained in position between the plates 6 through the medium of the screws 11. By disposing the upper edge 14 of the body member below or in spaced relation to the marginal edges 8 of the plates, a channel 15 is formed between the plates, said channel extending longitudinally of the trolley. It will be noted that when the plates are secured to the body member 12, that the guards 9 extend inwardly of the channel and toward each other in spaced parallel relation so as to partially restrict the opening or entrance to the channel, concave portion of the guards permitting the wire to be guided into the channel.

Each of the plates 6 is provided with a pair of spaced openings 16, one of said openings being disposed adjacent each end of the plate and in spaced relation to the upper edge of the body member 12. Each of the openings is intended to receive antifriction means 17, said means may be roller bearings, ball bearings, or graphite bushings. The openings of each plate are intended to register with adjacent openings in the opposite plate, for the reception of trolley rollers 18.

Each roller includes a stub shaft 19 on each end thereof, said shafts being journaled within the openings 16. The length of each roller is slightly less than the width of the channel 15 so that while the ends of the rollers do not engage the plates, it is at the same time impossible for the wire to become lodged between the rollers and the plates. It will be noted that each roller is disposed in spaced relation to the center of the trolley so that the roller is capable of adjusting itself to engage the wire regardless of the irregularities in the wire or road bed.

To permit this novel adjusting feature, an opening 20 is provided in the intermediate portion of each plate, a pivot pin 21 being passed through the openings C of the harp B and the opening 20 to pivotally connect the trolley to the harp. In this way it is possible for the trolley harp to oscillate on the trolley and through the coöperation of the trolley pole A, permit the rollers to engage the wire by adjusting themselves according to the movement of the car on the rails. It is of course obvious that the body member 12 is provided with openings $10^a$ and $20^a$ which register with the openings 10 and 20 of the plates 6 so that the plates may be firmly clamped to the body member. At the same time, the body member is solid so that the structure of the trolley is rendered substantial. By this novel arrangement, instead of one pivot point such as previously provided by the pivotal connection of the trolley pole to the car, two pivot points are provided not only by the last mentioned pivotal connection but by the pivotal connection of the trolley to the harp, the trolley rollers being independent of the harp. Therefore, when the trolley pole A adjusts itself, in view of the fact that the rollers are disposed a considerable distance beyond the ends of the harp, upon contact of one roller with the trolley wire, the other roller will be forced into engagement with the wire through the medium of the pivotal connection of the trolley to the harp. An important feature of the device is that these adjustments are automatic, so that the circuit through the car is never broken. Furthermore, the novel form of guards not only guide the trolley to the rollers, but project a sufficient distance above the wire to prevent the same from accidentally disengaging the rollers by lateral movement.

From the foregoing it will be readily seen that this invention provides a novel form of trolley, which comprises a small number of parts capable of being readily assembled and disassembled without the use of special facilities and wherein a relatively large area is provided for the reception of the trolley wire and as two rollers are used, the circuit is always maintained. In addition to this friction and wear is greatly reduced as there are no grooves in the rollers.

It is of course obvious that my invention is susceptible to some change and modifications, without departing from the principles and spirit thereof, and for this reason I do not wish to be understood as limiting myself to the precise arrangement, design or formation of the several parts herein shown in carrying out my invention in practice except as hereinafter claimed.

What is claimed is:—

1. An attachment for trolley harps comprising a pair of plates, one marginal edge of each plate being formed with a longitudinally extending protuberance, the protuberances of said plates extending toward each other, a body member disposed between said plates, said member terminating in spaced relation to the protuberances of the plates, means for detachably securing the plates to the body member, and rollers extending between the plates in spaced relation to said protuberances and the body member.

2. An attachment for trolley harps comprising a body member, a plate connected to each side of the body member, the upper portions of said plate extending above the body member in spaced parallel relation to each other to provide a longitudinal channel, the marginal edge of the upper portion of each plate being provided with a guard, said guards extending inwardly of the channel in spaced relation to each other, and a roller disposed in each end portion of the channel and journaled in the plates.

3. An attachment for trolley harps comprising a body member, a plate connected to each side of the body member, the upper portions of said plate extending above the body member in spaced parallel relation to each other to provide a longitudinal channel, the marginal edge of the upper portion of each plate being provided with a guard, said guards extending inwardly of the channel in spaced relation to each other, a roller disposed in each end portion of the channel and journaled in the plates, and means for pivotally connecting said trolley within the trolley harp.

In testimony whereof I hereunto affix my signature.

EARL W. SINNETT.